(12) United States Patent
Yu et al.

(10) Patent No.: US 6,731,368 B2
(45) Date of Patent: May 4, 2004

(54) MANUFACTURING PROCESS OF LIQUID CRYSTAL CELL FOR A SMALL SIZE LIQUID CRYSTAL DISPLAY DEVICE

(75) Inventors: Hwan-Seong Yu, Gyeongsangbuk-do (KR); Gyu-Su Cho, Gyeongsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/994,016

(22) Filed: Nov. 27, 2001

(65) Prior Publication Data

US 2002/0063843 A1 May 30, 2002

(30) Foreign Application Priority Data

Nov. 27, 2000 (KR) ..................... 2000-0071013

(51) Int. Cl.[7] ............ G02F 1/13; G02F 1/1343
(52) U.S. Cl. ............ 349/187; 349/73; 349/40
(58) Field of Search ............ 349/187, 73, 40, 349/190

(56) References Cited

U.S. PATENT DOCUMENTS 5,657,139 A * 8/1997 Hayshi .................. 349/40
2002/0063845 A1 * 5/2002 Lim .................... 349/189

* cited by examiner

*Primary Examiner*—Toan Ton
*Assistant Examiner*—Hoan Chau Nguyen
(74) *Attorney, Agent, or Firm*—McKenna, Long & Aldridge LLP

(57) ABSTRACT

In the typical LCD device, the ON/OFF inspection is performed by unit cell. However, in the case of the small size LCD device, since the liquid crystal cell substrate has many unit cells, the total inspection time is too long and the long handling time contributes to increasing the number of inferior cells. To solve these problems, the ON/OFF inspection of the liquid crystal cell for the small size LCD device having many unit cells is simultaneously performed for the entire liquid crystal cell substrate before cutting into the unit cells. Thus, the number of damaged cells during the inspection process and the process time can be reduced, and the yield can increase.

28 Claims, 9 Drawing Sheets

MANUFACTURING PROCESS OF LIQUID CRYSTAL CELL FOR A SMALL SIZE LIQUID CRYSTAL DISPLAY DEVICE

This application claims the benefit of Korean Patent Application No. 2000-71013, filed on Nov. 27, 2000, which is hereby incorporated by reference as if fully set forth herein.

BACKGROUND OF THE INVENTION

1. Field of the Invention

The present invention relates to a liquid crystal display device, and more particularly to a method of fabricating a liquid crystal cell for a small size liquid crystal display device in which an electrical on/off inspection can be easily performed.

2. Discussion of the Related Art

Liquid crystal display (LCD) devices having light, thin, low power consumption characteristics have been widely used in office automation (OA) equipment and video units. A typical LCD panel has upper and lower substrates and an interposed liquid crystal layer. The upper substrate, referred to as a color filter substrate, usually includes common electrodes and color filters. The lower substrate, referred to as an array substrate, includes switching elements, such as thin film transistors (TFTs), and pixel electrodes.

A brief explanation of a conventional liquid crystal cell manufacturing process and its operation will be discussed for better understanding of the present invention.

Common electrodes and pixel electrodes are formed on upper and lower substrates, respectively. A seal is then formed on the lower substrate. The upper and lower substrates are then bonded together using the seal such that the common electrodes of the upper substrate and the pixel electrodes of the lower substrate face each other, forming liquid crystal cells. Liquid crystal material is then injected into those cells through injection holes. The injection holes are then sealed. Finally, polarizing films are attached to the outer surfaces of the upper and lower substrates. The pixel and common electrodes generate electric fields that control the light passing through the liquid crystal cells. By controlling the electric fields, desired characters or images are displayed.

The liquid crystal cell process has few repeated steps compared with the TFT process or the color filter process. The whole process can be divided into the processes of forming the orientation film, forming the cell gap, injecting the liquid crystal and cutting the liquid crystal cell.

FIG. 1 is a flow chart showing a fabrication process of a typical liquid crystal cell for an LCD device.

At step ST1, an initial cleaning is performed after an upper substrate and a lower substrate are prepared. This step is for eliminating the impurities on the substrate before forming an orientation film.

At step ST2, the orientation film is formed on the upper and lower substrates. This step includes deposition and rubbing processes of the orientation film or polymer thin film. The formation of the orientation film enables the liquid crystal to operate normally by the uniform orientation of the liquid crystal molecules and is needed for the uniform display property. The most important part of this step is to deposit the orientation film uniformly over the wide area. A polymer compound of a polyimide family is widely used for the typical orientation film, and the deposited polymer compound becomes the polyimide thin film as an orientation film through the preliminary drying and the hardening process. The rubbing process scours the orientation film along one direction with the rubbing cloth and the liquid crystal molecules align along the rubbing direction.

At step ST3, a seal printing and a spacer deposition on the substrates are performed. The seal patterns form cell spaces that will receive the liquid crystal material and prevent the interposed liquid crystal material from leaking out of the completed liquid crystal cell. The seal patterning is a process of patterning a thermosetting plastic mixed with glass fiber. A screen-print method is widely used for this process. The next process is spraying spacers. The spacers have a definite size and act to maintain a precise and uniform space between the upper and the lower substrates. Accordingly, the spacers are placed with a uniform density on the substrate using either a wet spray method, in which the spacers are mixed in an alcohol and then sprayed, or a dry spray method, in which only the spacers are sprayed At step ST4, the upper and lower substrates are aligned and attached. The alignment margin, which is less than a few micrometers, is determined by the substrate design. If the upper and lower substrates are aligned and attached beyond the alignment margin, light leaks away such that the liquid crystal cell cannot adequately perform its function.

At step ST5, the liquid crystal cell fabricated through the previous four steps is cut into unit liquid crystal cells. Generally, after a plurality of unit liquid crystal cells are formed on a wide glass substrate, the liquid crystal cell is divided into the plurality of unit liquid crystal cells. The cutting process typically includes a scribing process using a diamond pen to form cutting lines on the substrate, and a breaking process separating the substrate along the scribed lines by force.

At step ST6, a liquid crystal material is injected into the unit liquid crystal cells. Since each unit liquid crystal cell is a few square centimeters in area, but has only a few micrometers gap between substrates, a vacuum injection method using a pressure difference is effectively and widely used. Generally, since injecting the liquid crystal material into the unit liquid crystal cells takes the longest manufacturing time, for manufacturing efficiency, it is important to have optimum conditions for the vacuum injection process. In a typical vacuum injection process, after the unit liquid crystal cells and the liquid crystal material are evacuated in a vacuum apparatus, an injection hole of the unit liquid crystal cell is dipped into a vessel that contains the liquid crystal material. First, since there is no difference in pressure between the interior of the unit liquid crystal cell and the liquid crystal material, the liquid crystal material is injected into the unit liquid crystal cell by capillary forces. Later, after nitrogen gases are introduced into the vacuum apparatus, the pressure difference between the interior and exterior of the unit liquid crystal cell forces liquid crystal material into the unit liquid crystal cell.

A sealing process, which prevents the liquid crystal from leaking through the injection hole, is performed after the injection. The sealing process includes depositing an ultra violet (UV) curable resin by using a dispenser and then sealing the injection hole by irradiation of UV light. Here, since deterioration can happen from contamination of the injection hole during moving or processing, the cell should be handled carefully so as to not contact the exterior material and be exposed for a long time.

At step ST7, an inspection process is performed on the plurality of unit liquid crystal cells. The inspection process is performed through eye or microscope inspection by applying a voltage to the unit liquid crystal cell that has pads of a plurality of gate and data lines, each of which is connected to the pad through a shorting bar, and a common electrode. During the inspection, the quality of the unit liquid crystal cell is determined by evaluating deterioration from the impurity, a point defect from the degraded TFT, a line defect from an open of the data and gate lines, and optical property deterioration from non-uniformity of the cell gap. For simplicity, the series of the inspection process mentioned above is called an ON/OFF inspection.

At step ST8, a grinding process is performed after the selection of high quality cells by the ON/OFF inspection. This step includes a process of cutting the shorting bar that prevents the cell from malfunctioning due to static electricity. After the grinding process, a liquid crystal module process is performed.

Next, the fabrication process of the liquid crystal cell for small size LCD devices will be briefly explained referring to the FIGS. 2A to 2E.

FIG. 2A shows the step of forming the orientation film on the upper and lower substrates.

A plurality of unit cells 12 and 22 are formed on upper and lower substrates 10 and 20 during the initial cleaning of the color filter and the array substrates, respectively. For example, about 64, 2-inch unit cells for the small size LCD devices can be formed on the upper and lower substrates, respectively, using glass substrates that are 370×470 mm$^2$ in size. An orientation film is formed on the upper and lower substrates 10 and 20 during steps ST1 and ST2 of FIG. 1.

FIG. 2B shows the step of alignment and attachment of the upper and lower substrates after steps ST1 and ST2 of FIG. 1.

Before the aligning and attaching step ST4, the seal printing and spacer deposition steps ST3 of FIG. 1 are performed, and then a liquid crystal cell substrate 30 having a uniform gap between the upper and lower substrates is formed.

FIG. 2C shows the step of the cutting process or the steps ST5 ST6 of FIG. 1.

In this step, the liquid crystal cell substrate 30, which passed through the aligning and attaching processes, is cut into the N unit liquid crystal cells 32 by the scribe and break processes.

FIG. 2D shows the step of injecting the liquid crystal and sealing or the step ST5 of FIG. 1.

The processes of injecting the liquid crystal and sealing the injection hole are performed for all or some of N unit liquid crystal cells 32 divided from the liquid crystal cell substrate in the vacuum apparatus by a cassette.

FIG. 2E shows the step of inspecting the unit liquid crystal cells or the step ST7 of FIG. 1.

This ON/OFF inspection for selecting the superior unit liquid crystal cells from the inferior ones is performed as many times as the number of the divided unit liquid crystal cells. For the ON/OFF inspection, the inspection pads 33, 34 and 35 formed through the array process are exposed in the cutting process of FIG. 2C (not shown) and electrical ON/OFF test is performed by applying a voltage to the pads 33, 34 and 35. The inspection pads 33, 34 and 35 are connected to the gate and drain shorting bars and the common electrodes of the upper substrate, respectively. After selecting the superior cells by the ON/OFF inspection, a process such as grinding or ST8, in which the edge of the liquid crystal cell substrate is polished, is performed only for the superior cells.

However, the fabrication process of the liquid crystal cell for the small size LCD devices has some problems as follows.

For example, the 64, 2-inch unit liquid crystal cells are formed on a glass substrate that is 370×470 mm$^2$ in size, and are individually inspected on an on/off jig for the ON/OFF inspection. Therefore, the total inspection time is too long and the long handling time contributes to increasing the number of inferior cells.

BRIEF SUMMARY OF THE INVENTION

Accordingly, the present invention is directed to a small size liquid crystal display device and manufacturing method thereof that substantially obviates one or more of the problems due to limitations and disadvantages of the related art.

An object of the present invention is to provide a liquid crystal cell for a small size liquid crystal display device and a manufacturing method thereof that has a high throughput.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a liquid crystal cell for a small size liquid crystal display device includes the steps of preparing a lower substrate having a plurality of first unit cells composed of array devices at a first region, a plurality of inspection pads at a second region, an inspection line connecting the inspection pads and the plurality of first unit cells, and data and gate lines at the first region; preparing an upper substrate having a plurality of second unit cells composed of color filter at a third region, a fourth region, a plurality of scribe keys at a borderline between the third and fourth regions and a common line at the third region; forming a seal pattern on the first region of the lower substrate; forming a liquid crystal layer on the lower substrate having the seal pattern; aligning and attaching the upper and lower substrates; exposing the inspection pads of the lower substrate by scribing and breaking the upper substrate along the scribe keys; and performing an ON/OFF inspection of all the unit liquid crystal cells by applying a voltage to the inspection pads of the lower substrate.

In another aspect of the present invention, a liquid crystal cell for a small size liquid crystal display device includes a lower substrate having a plurality of first unit cells composed of array devices at a first region, a plurality of inspection pads at a second region, an inspection line connecting the inspection pads and the plurality of first unit cells, and data and gate lines at the first region; an upper substrate having a plurality of second unit cells composed of color filter at a third region, a fourth region, a plurality of scribe keys at a borderline between the third and fourth regions and a common line at the third region; and a liquid crystal layer interposed between the upper and lower substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 3A:
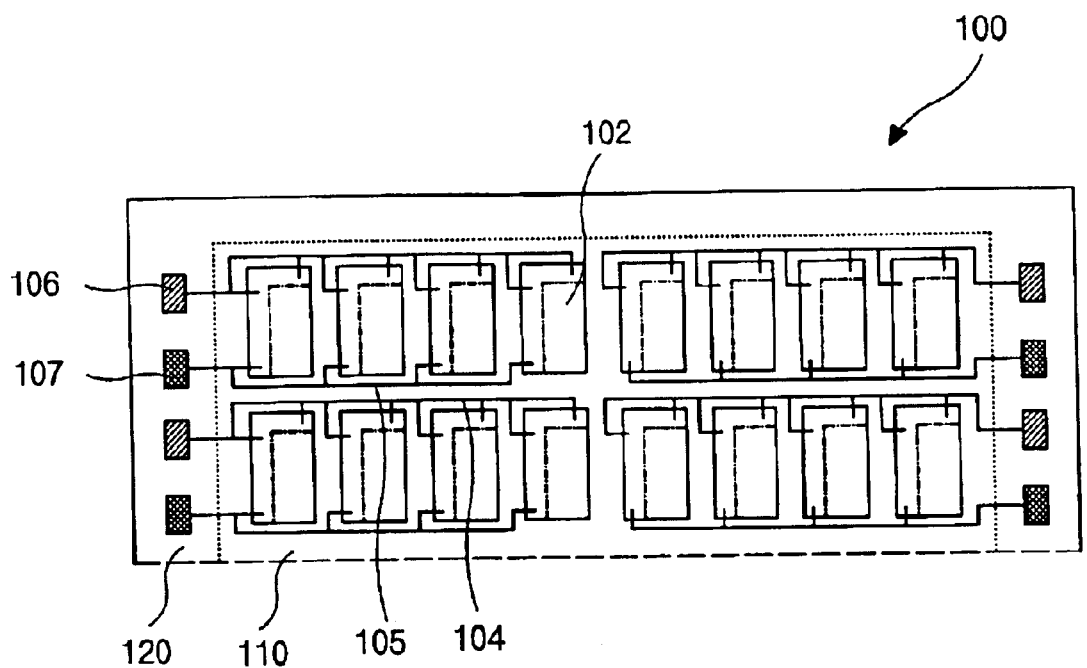
FIG. 3A is a plan view showing a region of a lower substrate for a small size LCD device according to an embodiment of the present invention.

FIG. 3A is a plan view showing a region of a lower substrate for a small size LCD device according to an embodiment of the present invention.

As shown, a lower substrate 100 has a first region 110 and a second region 120, on which a plurality of unit cells 102, and a plurality of first inspection pads 106 and second inspection pads 107 are formed, respectively. The inspection pads 106 and 107 are electrically connected to the unit cells 102 and positioned at an end portion of a first inspection line 104 and a second inspection line 105. A higher voltage (+) is applied to the first inspection pad 106 connected to a gate and data shorting bars, and a lower voltage (−), a common voltage, is applied to the second inspection pad 107. To perform an ON/OFF inspection of a plurality of unit liquid crystal cells simultaneously, the unit cells positioned on the same side of a column along the axis of symmetry of the substrate and the same row are connected to the same pads 106 and 107 through the first and second inspection lines 104 and 105, respectively. Of course, other connecting structures can be applied to the present invention.

Figure 3B:
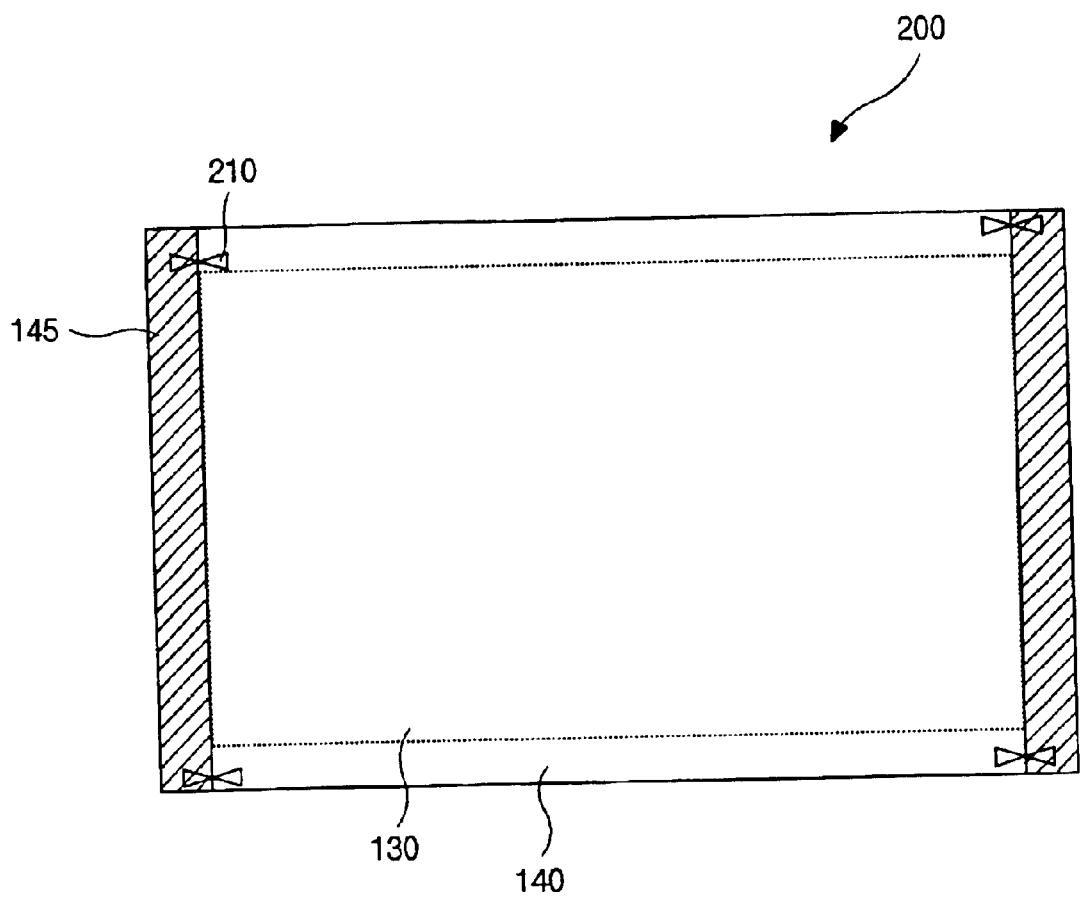
FIG. 3B is a plan view showing a upper substrate for a small size LCD device according to an embodiment of the present invention.

FIG. 3B is a plan view showing an upper substrate for a small size LCD device according to an embodiment of the present invention, especially a region that does not attach with the lower substrate.

As shown, the upper substrate 200 has a third region 130, on which a plurality of unit cells (not shown) composed of a color filter are formed, and a fourth region 140 having no unit cells. Furthermore, a scribe key 210 is formed on a border between the third and fourth regions 130 and 140. In the following process, to expose the inspection pad 106 (FIG. 3A) of the lower substrate, the hatched region 145 is cut along the scribe key 210, which can be formed on a plurality of positions of the border and preferably on the top and bottom of the right and left ends.

FIGS. 4A to 4E are schematic plan views showing by stages a fabrication process of a liquid crystal cell for a small size LCD device according to an embodiment of the present invention.

Figure 4A:
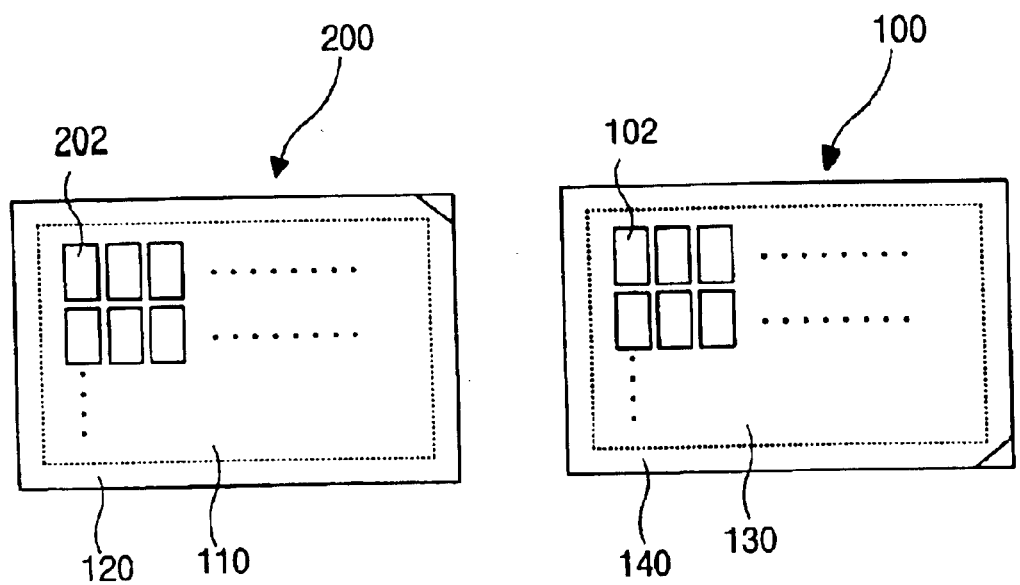
FIGS. 4A to 4E are schematic plan views showing by stages a fabrication process of a liquid crystal cell for a small size LCD device according to an embodiment of the present invention.

FIG. 4A shows the step of forming an orientation film on the upper and lower substrates 200 and 100.

A plurality of first unit cells 202 and second unit cells 102 are formed on the upper and lower substrates 200 and 100. The lower substrate 200 has first regions 110 and second regions 120 that include the first unit cells 202 and no cells, respectively. The upper substrate 100 has third and fourth regions 130 and 140 that include the second unit cells 102 and no cells, respectively. For example, about 64, 2-inch first and second unit cells can be formed on the upper and lower substrates 200 and 100 made of glass that is about 370×470 mm$^2$ in size, respectively. An orientation film (not shown) is formed on the upper and lower substrates 200 and 100 according to the steps ST1 and ST2 of FIG. 1.

Figure 4B:
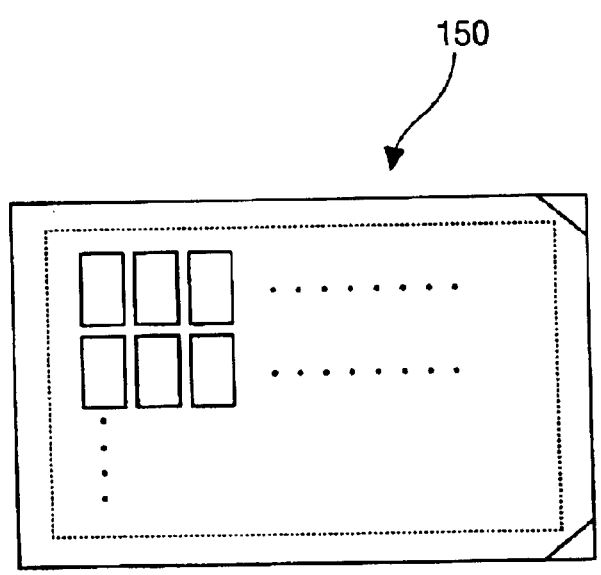

FIG. 4B shows the step of forming a liquid crystal cell substrate 150 (upper and lower substrates).

Figure 1:
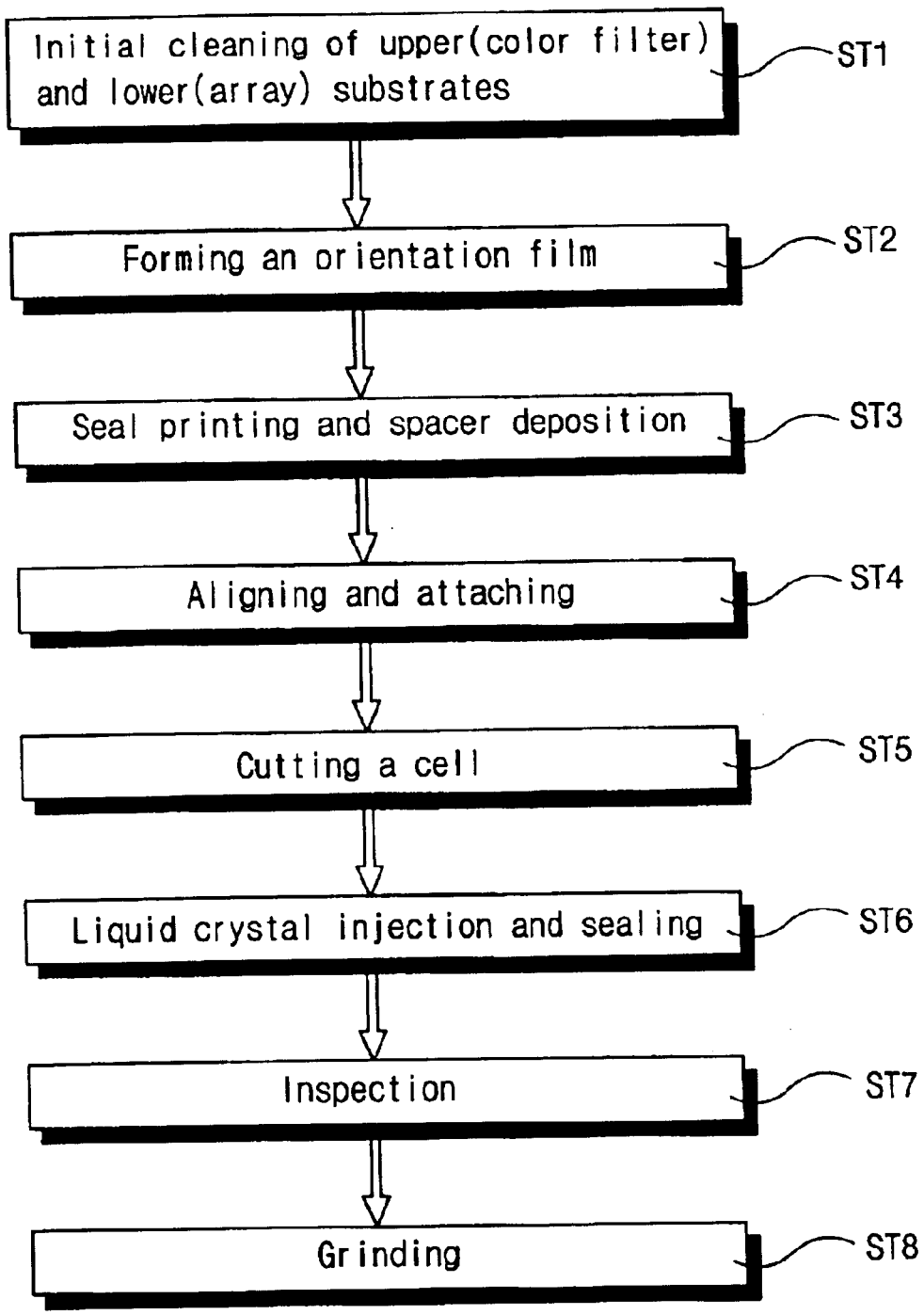
FIG. 1 is a schematic flow chart showing a fabrication process of a liquid crystal cell for a typical LCD device.
Figure 2A:
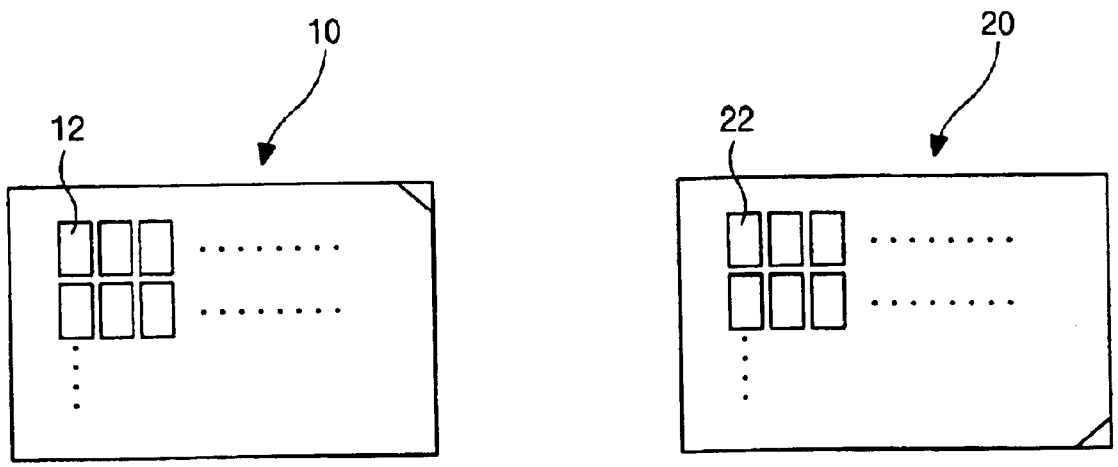
FIGS. 2A to 2E are schematic plan and perspective views showing by stages a fabrication process of a liquid crystal cell for a typical small size LCD device.
Figure 2B:
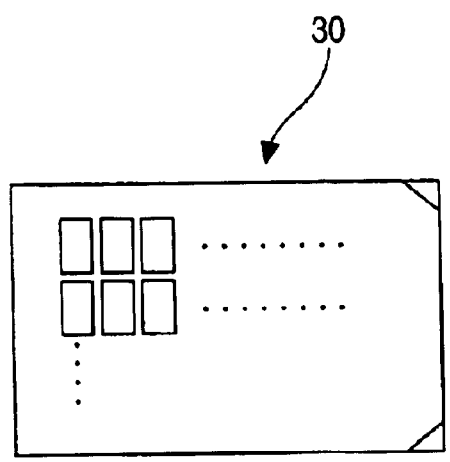
Figure 2C:
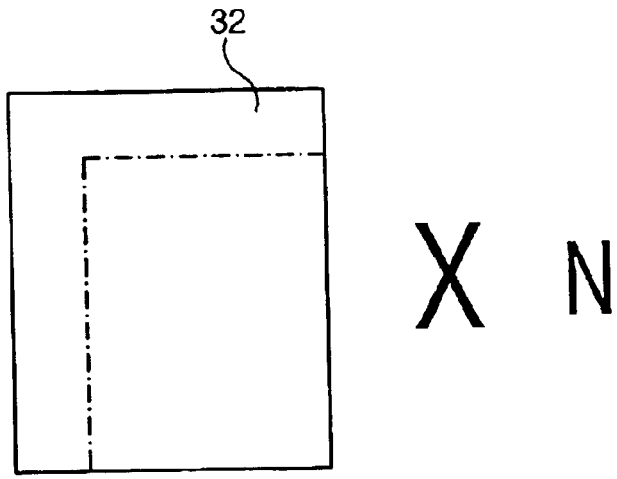
Figure 2D:
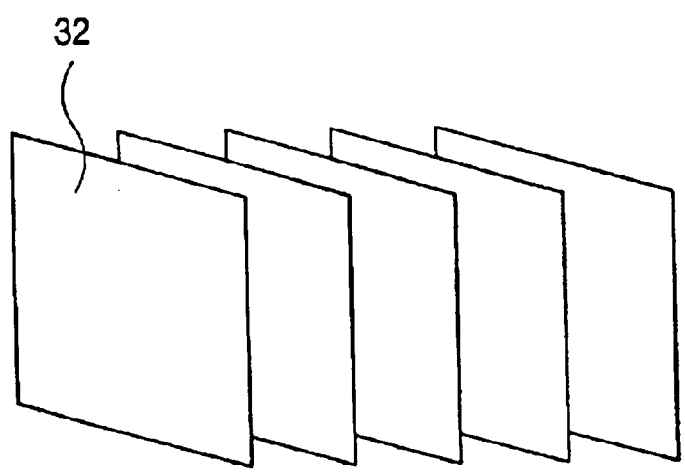
Figure 2E:
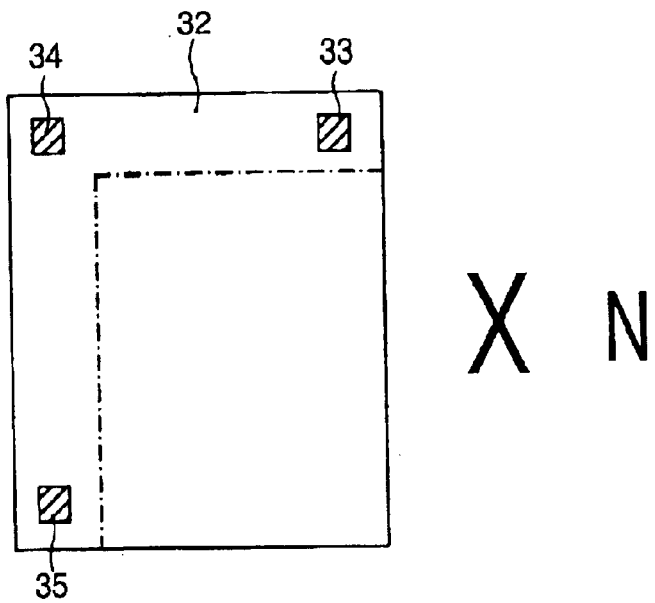

After forming a seal pattern on the lower substrate 100 of FIG. 4A according to the step ST3 of FIG. 1, a liquid crystal is dropped on the lower substrate 100 of FIG. 4A in a vacuum chamber by a dispensing method and then the upper and lower substrates 200 and 100 of FIG. 4A are aligned and attached in the same chamber. In the related art, after the substrate is cut into a plurality of unit cells, the liquid crystal material is individually injected into the unit cells. However, according to the present invention, to perform an electrical inspection on the original glass substrate at one time, a liquid crystal material injection process such as the dispensing method is performed before the cutting process. The advantage of the dispensing method is to simplify the fabrication process due to the one time process of liquid crystal material injection in the substrate has many cells such as small size LCD devices. Of course, other methods, in which the liquid crystal material is injected before the cell cutting, can be adopted.

Figure 4C:
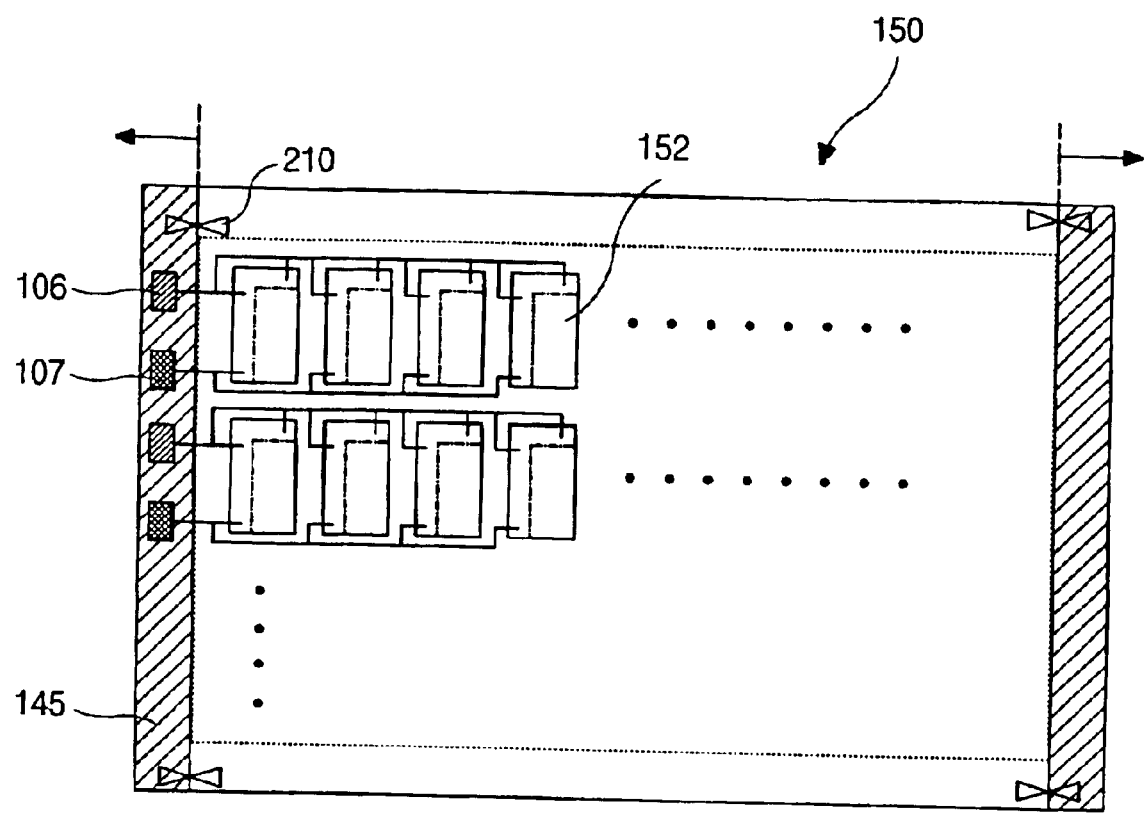

FIG. 4C is the step of scribe/break the liquid crystal cell substrate 150 for exposure of a plurality of inspection pads.

After scribing the upper substrate 200 of FIG. 4A along the scribe key 210 and breaking a hatched region 145, the inspection pads 106 and 107 of the lower substrate 100 are exposed.

Figure 4D:
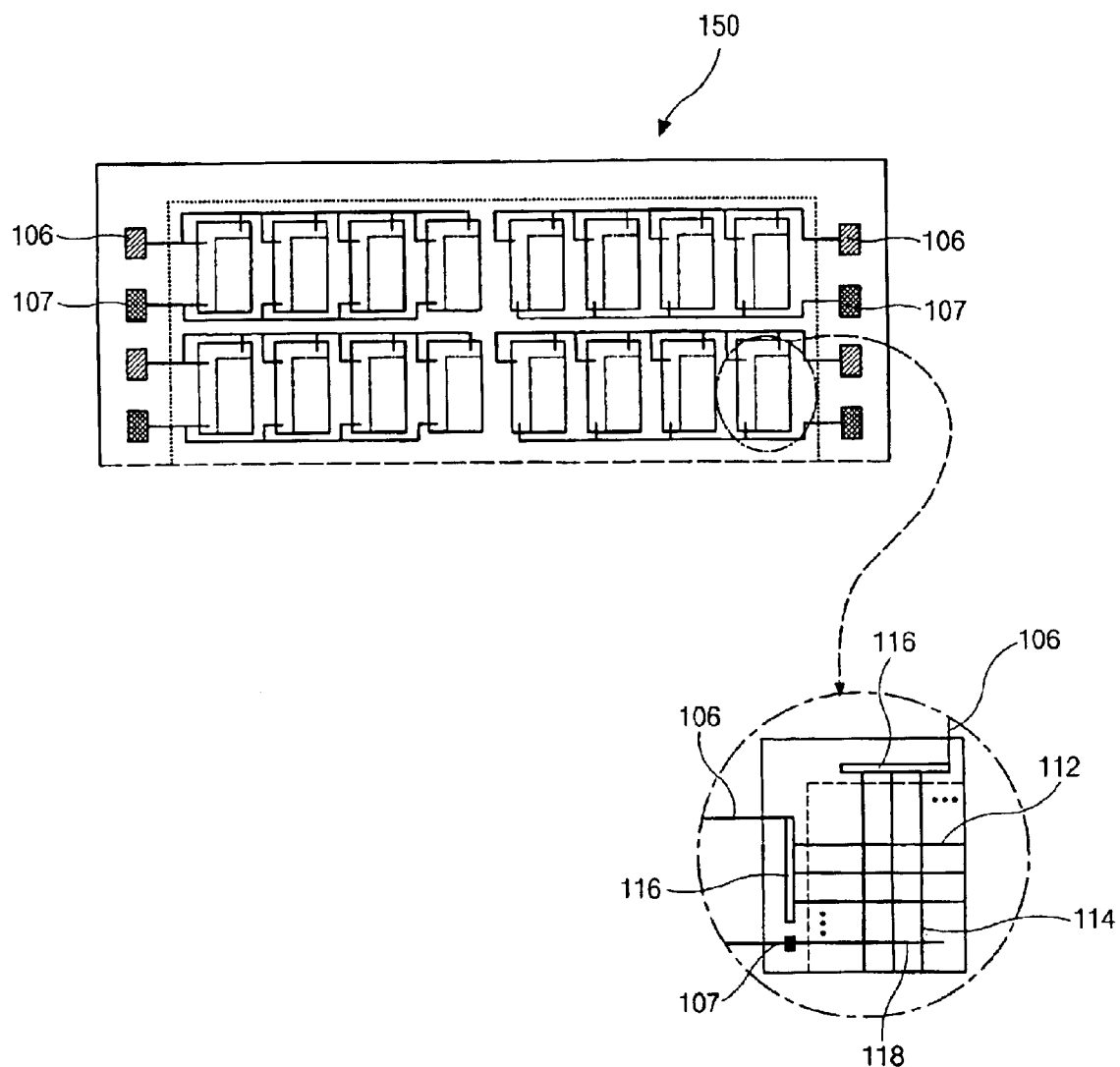

FIG. 4D is the step of selecting superior cells by the electrical ON/OFF inspection.

As shown, the electrical ON/OFF inspection of all the unit liquid crystal cells is performed at one time by simultaneously applying the voltage to the inspection pads 106 and 107 of the liquid crystal cell substrate 150.

Figure 4E:
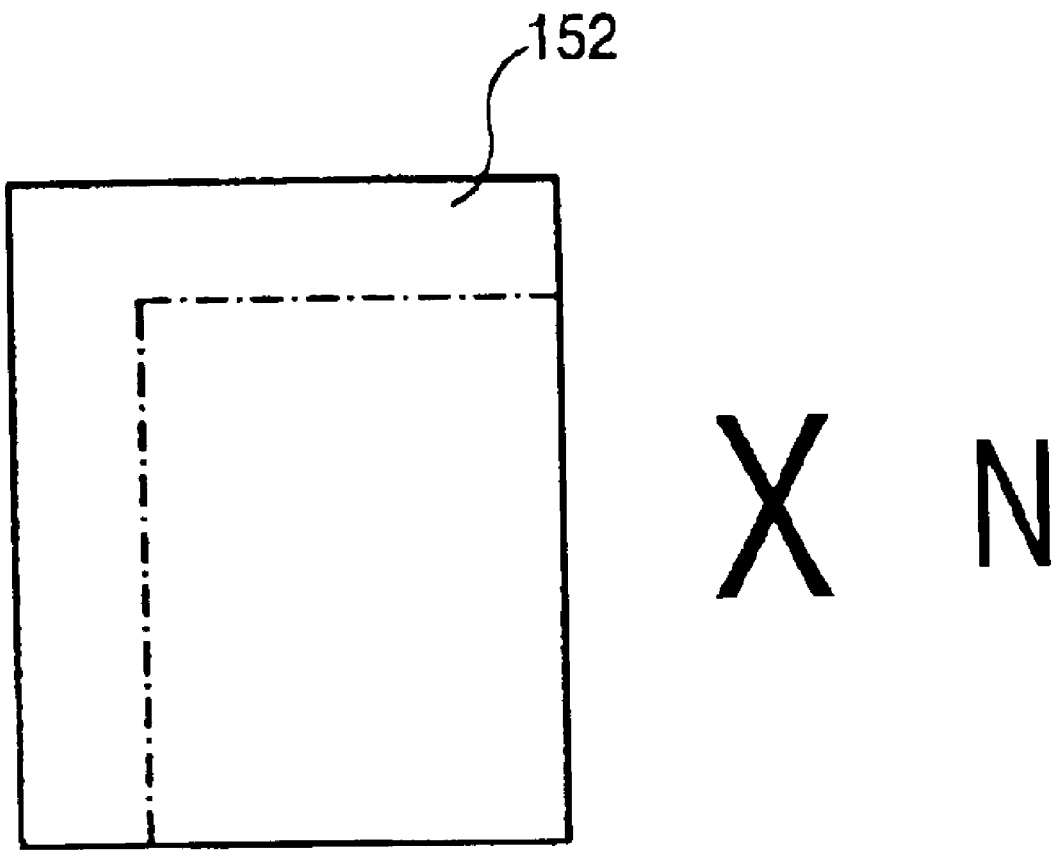

FIG. 4E is the step of cutting the liquid crystal cell substrate 150 of FIG. 4D into N unit liquid crystal cells 152.

After the cutting process, a shorting bar for protecting the cell from static electricity is cut and then a process such as grinding, in which the edge of the liquid crystal cell substrate is polished, is performed.

Consequently, in an embodiment according to the present invention, since the ON/OFF inspection of the liquid crystal cell substrate for the small size LCD device having many unit liquid crystal cells is simultaneously performed for the entire liquid crystal cell substrate before cutting into the unit cells, the number of damaged cells during the inspection process and the process time can be reduced, and the yield can be increased.

It will be apparent to those skilled in the art that various modifications and variations can be made in the method of manufacturing a flat panel display device of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal cell for a small size liquid crystal display device, comprising:
    preparing a lower substrate having a first region and a second region, a plurality of first cells at the first region, the plurality of first cells composed of array devices, a plurality of inspection pads at the second region, and an inspection line connecting the inspection pads and the plurality of first cells;
    preparing an upper substrate having a third region and a fourth region, a plurality of second cells at the third region, the plurality of second cells composed of a color filter, and a plurality of scribe keys at a border between the third and fourth regions;
    forming a liquid crystal layer on the lower substrate;
    attaching the upper and lower substrates;
    exposing the inspection pads of the lower substrate by scribing and breaking the upper substrate along the scribe keys; and
    performing an ON/OFF inspection of all the cells by applying a voltage to the inspection pads of the lower substrate.

2. The method of fabricating a liquid crystal cell for a small size liquid crystal display device according to claim 1, further comprising:
    cutting the attached substrates into unit liquid crystal cells; and
    performing a grinding process, wherein an edge of a unit liquid crystal cell is polished.

3. The method of fabricating a liquid crystal cell for a small size liquid crystal display device according to claim 2, wherein the liquid crystal layer is formed before the cutting.

4. The method of fabricating a liquid crystal cell for a small size liquid crystal display device according to claim 3, wherein after the cutting, a shorting bar for protecting the cell from static electricity is cut before the grinding process.

5. The method of fabricating a liquid crystal cell for a small size liquid crystal display device according to claim 1, wherein the lower and upper substrates are made of glass.

6. The method of fabricating a liquid crystal cell for a small size liquid crystal display device according to claim 5, wherein the lower and upper glass are about 370×470 mm$^2$ in size.

7. The method of fabricating a liquid crystal cell for a small size liquid crystal display device according to claim 1, wherein the liquid crystal is formed in a vacuum chamber by a dispensing method.

8. The method of fabricating a liquid crystal cell for a small size liquid crystal display device according to claim 7, wherein the lower and upper substrates are aligned and attached in the vacuum chamber.

9. The method of fabricating a liquid crystal cell for a small size liquid crystal display device according to claim 1, further comprising:
    providing gate lines and data lines at the first region; and
    providing a common line at the third region.

10. The method of fabricating a liquid crystal cell for a small size liquid crystal display device according to claim 9, wherein the inspection pads are composed of first inspection pads connected to the gate and data lines, and second inspection pads connected to the common line.

11. The method of fabricating a liquid crystal cell for a small size liquid crystal display device according to claim 10, further comprising:
    cutting the attached substrates into unit liquid crystal cells; and
    performing a grinding process, wherein an edge of a unit liquid crystal cell is polished.

12. The method of fabricating a liquid crystal cell for a small size liquid crystal display device according to claim 1, further comprising aligning the upper and lower substrates.

13. A liquid crystal cell for a small size liquid crystal display device, comprising:
    a lower substrate having a first region and a second region, a plurality of first cells at the first region, the plurality of first cells composed of array devices, a plurality of inspection pads at the second region, and an inspection line connecting the inspection pads and the plurality of first cells;
    an upper substrate having a third region and a fourth region, a plurality of second cells at the third region, the plurality of second cells composed of a color filter, and a plurality of scribe keys at a border between the third and fourth regions; and
    a liquid crystal layer interposed between the upper and lower substrates.

14. The liquid crystal display device according to claim 13, wherein the lower and upper substrates are made of glass.

15. The liquid crystal display device according to claim 14, wherein the lower and upper glass are about 370×470 mm$^2$ in size.

16. The liquid crystal display device according to claim 13, further comprising:
    gate lines and data lines at the first region; and
    a common line at the third region.

17. The liquid crystal display device according to claim 16, wherein the inspection pads are composed of first inspection pads connected to the gate and data lines, and second inspection pads connected to the common line.

18. A method of fabricating a liquid crystal cell for a liquid crystal display device, comprising:
    preparing a lower substrate having a first region and a second region, a plurality of array cells at the first region, the plurality of array cells composed of array devices, a plurality of inspection pads at the second region, and an inspection line connecting the inspection pads and the plurality of array cells;
    preparing an upper substrate having a plurality of a third region and a fourth region, a plurality of color filter cells composed of a plurality of color filters, and a plurality of scribe keys at a border between the third and fourth regions;
    forming a liquid crystal layer on the lower substrate;
    assembling the upper and lower substrates thereby forming a plurality of cells;
    exposing the inspection pads of the lower substrate by scribing and breaking the upper substrate along the scribe keys; and
    performing an ON/OFF inspection to all of the plurality of cells by applying a voltage to the inspection pads of the lower substrate.

19. The method of fabricating a liquid crystal cell for a liquid crystal display device according to claim 18, further comprising:
    cutting the assembled substrates into the cells; and
    performing a grinding process, wherein an edge of each of the cells is polished.

20. The method of fabricating a liquid crystal cell for a liquid crystal display device according to claim 19, wherein the liquid crystal layer is formed before the cutting.

21. The method of fabricating a liquid crystal cell for a liquid crystal display device according to claim 20, wherein after the cutting, a shorting bar for protecting the cell from static electricity is cut before the grinding process.

22. The method of fabricating a liquid crystal cell for a liquid crystal display device according to claim 18, wherein the lower and upper substrates are made of glass.

23. The method of fabricating a liquid crystal cell for a liquid crystal display device according to claim 22, wherein the lower and upper glass are about 370×470 mm$^2$ in size.

24. The method of fabricating a liquid crystal cell for a liquid crystal display device according to claim 18, further comprising:

providing gate lines and data lines at the first region; and providing a common line at the third region.

25. The method of fabricating a liquid crystal cell for a liquid crystal display device according to claim 24, wherein the inspection pads are composed of first inspection pads connected to the gate and data lines, and second inspection pads connected to the common line.

26. The method of fabricating a liquid crystal cell for a liquid crystal display device according to claim 25, further comprising the steps of:

cutting assembled substrates into the cells; and performing a grinding process, wherein an edge of each of the cells is polished.

27. The method of fabricating a liquid crystal cell for a liquid crystal display device according to claim 18, wherein the liquid crystal layer is formed by a dropping and dispensing method.

28. The method of fabricating a liquid crystal cell for a liquid crystal display device according to claim 27, wherein the lower and upper substrates are assembled in the vacuum chamber.

* * * * *